SHIELDING DEVICE

Filed July 9, 1952 3 Sheets-Sheet 1

Inventors.
Linsley S. Gray
Lester W. Bell
By McCanna & Morsbach Attys.

Jan. 14, 1958 L. S. GRAY ET AL 2,820,082

SHIELDING DEVICE

Filed July 9, 1952 3 Sheets-Sheet 2

Inventors
Linsley A. Gray
Lester W. Bell
By McLane & Morlock Attys.

Jan. 14, 1958 L. S. GRAY ET AL 2,820,082

SHIELDING DEVICE

Filed July 9, 1952 3 Sheets-Sheet 3

Inventors
LINSLEY S. GRAY and
LESTER W. BELL
by McCanna & Morsbach
Attorneys

United States Patent Office 2,820,082

Patented Jan. 14, 1958

2,820,082

SHIELDING DEVICE

Linsley S. Gray, Aurora, and Lester W. Bell, Oswego, Ill., assignors to Gray Stamping & Manufacturing Co., Plano, Ill., a corporation of Illinois Application July 9, 1952, Serial No. 297,902

2 Claims. (Cl. 174—35)

The present invention relates to shielding devices, and more particularly to shielding devices for electron discharge valves, commonly referred to as "tubes," vacuum tubes, or the like.

Shielding devices generally comprising a shield and base clip assembly for the same are employed with certain types of vacuum tubes in various applications, primarily to prevent either inductive or capacitive coupling from sources external to that of the vacuum tube to be shielded. Generally, such shielding is essential in amplifier stages of various electronic devices, for example, in which a high gain is present or in which the signal level being utilized is low. This is because noise or extraneous radiation becomes a large proportion of the amplified signal voltage and it is, therefore, essential to shield such vacuum tubes from noise or extraneous radiation.

Because the primary purpose of such shielding devices is to prevent inductive and capacitive coupling, it is necessary that the shield be adequately grounded in order to prevent the shield itself from constituting an additional capacitance element surrounding the vacuum tube being shielded through which extraneous radiation may be transmitted with the resulting distortion of the fidelity of reproduction of the useful or desired signal therein.

In addition to the primary purpose of such shielding devices, they also fulfill certain secondary functions, such as preventing the incidence of light rays upon the grid or cathode structure of tubes not adequately shielded by the internal shielding structure disposed within the tube envelope. This feature is particularly true in very sensitive high gain amplifiers wherein such light striking the tube elements produces an appreciable photoelectric effect with the consequent increase in extraneous signal level, and, hence, in the noise level superimposed on the signal produced in the tube.

Another secondary use of shielding devices, usually confined to transmitting equipment, resides in the provision of means for aiding in cooling such tubes. Such shields are arranged to be spaced slightly from the tubes to define a sort of chimney for convection currents.

It will be understood that such shields have general application wherever electronic discharge valves are employed, one common usage being in television receivers where, for example, shields are usually provided for the tubes in the tuner assembly, since the level of the signal in the tuner is very low and the gain of these stages of the tuner assembly is usually very high. This is similarly true for the intermediate frequency amplifier stages, wherein the gain is usually very high in view of the transformer coupling most commonly utilized in these stages. Likewise, it is often necessary to utilize shields on the amplifier tubes in the audio-frequency sections of wave signal receivers, such as television receivers, in order to prevent objectionable 60-cycle hum. This hum is produced by the relatively large fields of 60-cycle radiation present on the television chassis because of the inherent high power ratings of television transformers, and also due in part to the 60-cycle frequency in the vertical sweep circuits.

In addition to shielding tubes from external radiation, such shielding devices are also employed to prevent radiation from such tubes to other elements of an associated circuit, as, for example, in television receivers where it is desirable to shield the vertical oscillator to prevent propagation of the 60-cycle field produced therein.

It will be understood that space is usually an important factor in devices employing tubes requiring shielding. Hence, it is essential that any shielding device occupy a minimum of space, with the result that any chassis employing tubes may be substantially as compact whether or not shields are employed. It would be desirable, therefore, to provide a shielding arrangement requiring a minimum of space.

Such shielding devices are conventionally employed with miniature tubes which have been adopted as a space saving factor. These miniature tubes employ relatively thin lead-in wires projecting through the glass envelope of the tube, which lead-in wires serve as prongs insertable into a tube socket or receptacle mounted on a suitable chassis. Vibration will tend to loosen such tubes from their sockets, and this is particularly true of miniature tubes where the sockets do not grip the prongs as firmly as in the larger size tubes. It would be desirable, therefore, to provide a shielding arrangement which would effectively lock the electron tubes or valves against release from the socket while performing its normal shielding function, and, moreover, which will provide a good ground essential to proper shielding.

It is a well-known fact that the manufacturers of vacuum tubes have established very wide tolerances with respect to the diameters and lengths of such vacuum tubes. This poses a problem for a shielding device which must be capable of use with a partiular line of tubes regardless of the tolerances. It would be desirable, therefore, to provide a shielding device which would permit substantial variation in diameter and length of the tube envelope while still performing a satisfactory shielding operation and additionally aiding in holding the tube in the socket as mentioned above despite variations in diameter and effective length of the tube.

It is an object, therefore, to provide a new and improved shielding device having the advantages enumerated above which would provide very satisfactory shielding.

It is another object of the present invention to provide an improved shielding device which will require a minimum amount of material and which can be manufactured in a simple, inexpensive manner involving simple manufacturing operations.

It is another object of the present invention to provide an improved shielding device which will insure a large grounding area and firm gripping of the associated vacuum tube which it is to shield to insure holding of the tube in its socket in spite of vibrations and shock.

A further object of the present invention resides in the provision of an improved shielding device capable of being applied to tubes having wide variations in diameter and length.

Still another object of the present invention resides in the provision of an improved shielding device which will permit convection currents to cool the tube, which will still hold the tube firmly in its socket against shock and vibration, and which will provide the necessary shielding against external or internal radiation.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

Figures 1, 2, 3, 4, 5, 6, 7, 8:
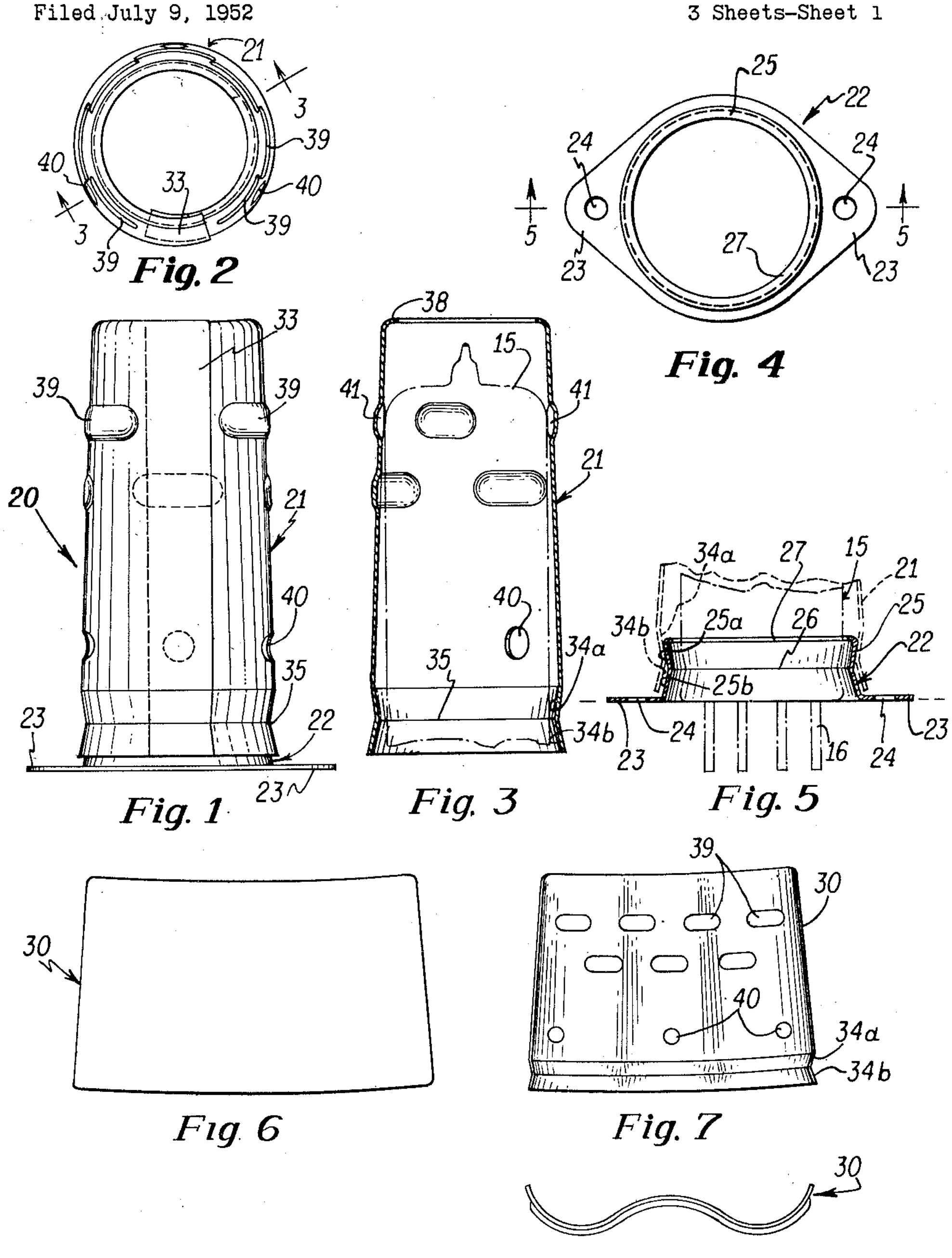
Fig. 1 is an elevational view of a shielding device including a shield and base clip comprising one embodiment of the present invention.
Fig. 2 is a top view of the shield only of Fig. 1 without the base clip.
Fig. 3 is a sectional view taken on line 3—3 of Fig. 2.
Fig. 4 is a top view of the base clip shown in Fig. 1 with the shield removed.
Fig. 5 is a sectional view taken on line 5—5 of Fig. 4 with a portion of the shield and a portion of a tube being shielded thereby, shown in dotted lines, in order to aid in better understanding the device of the present invention.
Fig. 6 is a blank of metal illustrating one step in the process of manufacturing the shield of the present invention.
Fig. 7 is a view similar to Fig. 6 illustrating another step in the process of manufacturing the shield of the present invention.
Fig. 8 is a bottom view of Fig. 7.
Figure 10:
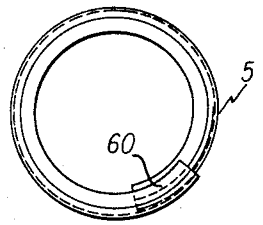
Fig. 10 is a top view of the shield portion only of Fig. 9, assuming that Fig. 9 shows the complete structure.
Figure 11:
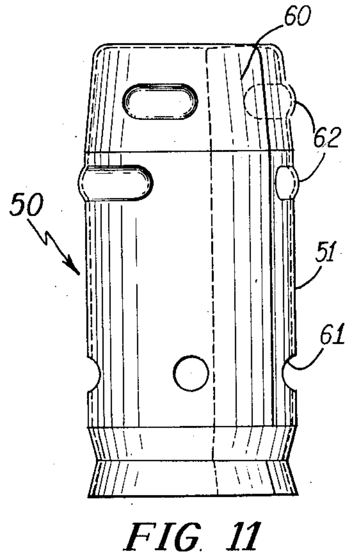
Fig. 11 is a vertical elevational view of the shield of Fig. 10.
Figure 9:
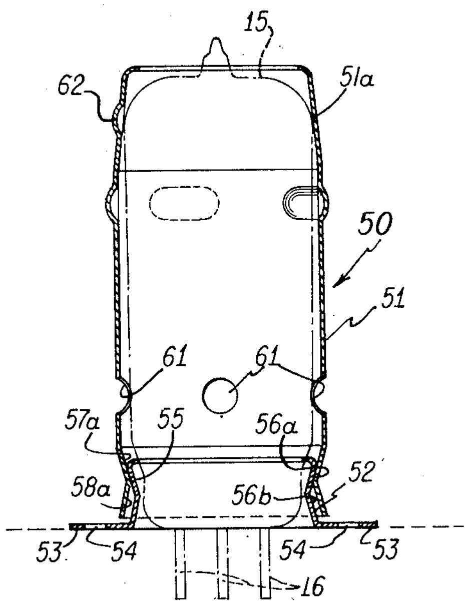
Fig. 9 is a vertical sectional view of a modified form of the shielding device embodying the present invention, showing the shield and base clip in assembled relationship with respect to an electron discharge valve being shielded thereby.
Figure 12:
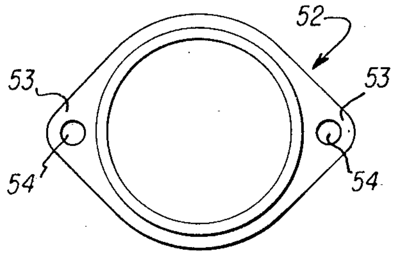
Fig. 12 is a top view similar to Fig. 10 of the base clip portion only of Fig. 9.
Figure 13:
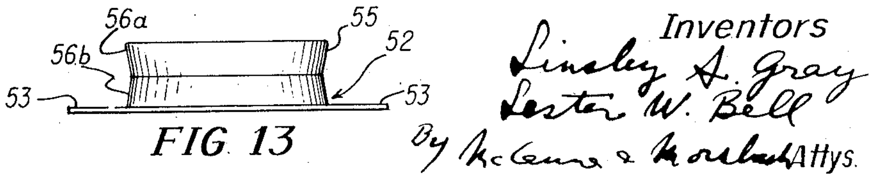
Fig. 13 is an elevational view of the device shown in Fig. 12.

Referring now to the drawings, and particularly to Figs. 1 to 8 thereof, the present invention has been illustrated as particularly adapted for shielding electron discharge valves or tubes of the so-called miniature type, although it should be understood that the invention is not limited to shielding miniature tubes but is adapted to shield numerous other types of tubes. However, for the purpose of illustrating the invention, the description will be concerned with shielding miniature tubes, since it has specific advantages when used with such miniature tubes. By miniature tubes are meant tubes of the general class including such tubes as 1R5, 1S5, 1T4, 6AK5, 12BA6, etc. These tubes, according to the specifications of tube manufacturers, have a maximum diameter of ¾ of an inch, a maximum overall length of 2⅛ inches, and a maximum length of the glass envelope portion of 1⅞ inches. As a practical matter, these tubes vary widely in dimensions, and it is necessary in connection with shielding devices to accommodate the extreme tolerances which the manufacturers allow themselves in the dimensions of the tubes. A representative tube is illustrated by dotted lines in Figs. 3 and 5 of the drawings and is designated by the reference numeral 15. In miniature type tubes the prongs 16 protrude directly through the glass envelope and are insertable into a suitable tube socket not shown. The prongs 16 are relatively slender wires, and, although the sockets comprise resilient fingers for gripping these prongs, vibration tends to loosen the prongs, since the gripping action of such relatively small diameter wires is not very great.

The improved shielding device of the present invention, shown in elevation in Fig. 1 of the drawings, is generally designated by the reference numeral 20 and comprises a shield member 21 and a clip or support member 22, the latter being attached to the chassis, preferably by the same means which holds the socket to the chassis. Considering first the clip or support member of the present invention, generally designated by the reference numeral 22 and best shown in Figs. 4 and 5 of the drawings, this clip or support member may be formed from any suitable conducting material such as aluminum, brass, steel or the like. It comprises a flat portion, including a pair of ears 23 having openings 24 defined therein for receiving suitable fastening means such as eyelets for fastening the member 22 to the chassis of the wave signal receiver or other electronic device with which the present invention is used. The same eyelets or other means for holding the support 22 in position may be used to hold the associated tube socket in position. In addition to the ears 23, the support or clip 22 includes an annular portion 25 extending in a plane substantially perpendicular with the plane in which the ears 23 are disposed. If the tube 15 to be shielded is mounted in an upright position, the annular portion 25 extends upwardly, although obviously for different mounting conditions of the tube it may extend in any direction.

In accordance with the present invention, the upwardly extending portion 25 of the support 22 has an overall height of the order of about ¼ of an inch or less, and comprises two annular surfaces **25*a* and 25*b* disposed in an angular relationship so as to form around the outside of the upstanding portion 25 a depression of somewhat V-shaped configuration, with the apex of the V-shaped cross section occurring at a line 26, which is the junction of the angularly disposed annular surfaces 25*a* and 25*b*. It will be understood that the portion 25 will surround the tube socket, and, since it is ¼ of an inch or less in height, it will not interfere in locating the tube prongs in the proper socket terminals since they can readily be viewed over the top of the portion 25. The member 22 may be made of aluminum, steel, brass, etc. If it is made of steel, it should preferably be coated with tin plate or aluminum as a protective measure. The present invention in the illustrated preferred embodiment is concerned primarily with the particular shape of the upstanding portion 25 and, particularly, the angularly disposed surfaces 25*a* and 25*b*, and the kind of material or the particular manufacturing operation in obtaining the configuration is not important as far as the present invention is concerned. It will be understood, however, that the member 22 can be made by a suitable stamping operation or in any other suitable manner. As illustrated, the top of the portion 25, as viewed in Fig. 5 of the drawings, is preferably provided with an in-turned edge designated at 27 in the drawings. From the following description it will be apparent that particularly the surface 25*a* comprises a grounding and locking surface for the shield portion 21 described hereinafter, and to this end the base clip or support 22** should provide a good ground connection as by being electrically connected with the chassis of the wave signal receiver or other similar device.

The shield portion 21 of the present invention should satisfactorily perform the functions and include the desirable features enumerated above, and in accordance with the present invention preferably has a somewhat conical configuration in that the walls have a decided taper either for the entire extent thereof or for a substantial extent thereof. As illustrated in Figs. 1 and 2 of the drawings, the shield 21 is preferably formed of a material such as ordinary steel or other similar material, although it can be made of hard brass, hard aluminum, or tin plate. It is, of course, important that it be a good conductor, and if made of steel it may be coated with tin or aluminum or the like. In the preferred embodiment of the present invention, the shield 21 is formed of a single sheet or blank of metal in the shape approximating an isosceles trapezoid as shown in Fig. 6 and designed by the reference numeral 30. In manufacturing the shield 21 from the blank 30 the latter is formed or rolled in a series of forming operations into somewhat tubular configuration of smaller diameter at one end than at the other, and with the ends of the blank having nonparallel edges overlapped to provide the overlap portion generally designated at 33. The nonparallel edges of the isosceles trapezoidal blank are then substantially parallel. This overlap portion tends to permit expansion of the shield to accommodate tubes of larger diameter.

For the purpose of electrically engaging the base clip or support member 22 and for performing the additional functions enumerated above, the end of the shield 21 having the larger diameter is provided with a mating portion cooperable with the portion 25 of the support 22. This mating portion comprises a pair of contiguous angularly disposed annular surfaces **34*a* and 34*b* which join at a line 35, any point of said line being the apex of a V-shaped cross section of this portion of the shield. The line 35 defines the portion of minimum diameter of the surfaces 34*a* and 34*b*. With this arrangement the lower end of the shield which is flared may be telescoped over the portion 25 of the clip 22 so that the surface 34*a* of the shield 21 may tend to make contact over a relatively large surface area with the surface 25*a*. Moreover, the inherent resilience of the material from which the shield 21 is made will tend to cause the portion of the shield defining the surfaces 34*a* and 34*b* to assume a minimum diameter, thus tending to cause the shield to move downwardly as viewed in Fig. 4 of the drawings, and consequently tending to cause more complete telescoping of the portion 25 and the shield 21. This will furthermore tend to maximize the surface area of contact between the annular surfaces 25*a* and 34*a*. In fact, with no tube 15 in the socket the shield 21 will tend to move to a position where the lines 26 and 35 are in close proximity. It will be noted that the annular surface 25*a* of the base clip 22 decreases in a direction toward the ears 23 and is the important portion of clip 22, since surface 25*b*** might have a different configuration from that shown and still function satisfactorily.

To hold a tube such as 15 in position in the socket not shown, the upper portion of the shield 21 is of smaller diameter than the smallest diameter of tube 15 likely to be encountered, with reference to the manufacturer's tolerances in manufacturing such tubes. By virtue, therefore, of the taper of the walls of the shield 21, contact with the tube envelope will be made, and such contact will be an annular line contact. The position of said annular line contact will vary in dependence upon the length and diameter of the tube, but in accordance with the present invention such contact will be had whereby the shield 21 will grip the tube and tend to hold it in its socket. Moreover, the parallel disposed annular surfaces **25*a* and 34*a* which are in contacting engagement when the shield is in shielding position are of sufficient extent to take care of the differences in diameter and length of such tubes 15, and by virtue of the taper firmly hold the tube and still provide a large ground contact surface between the shield 21 and the base clip or support 22**. In prior art devices such grounding resided in almost point contact, often resulting in a poor grounding connection, which is obviated by the present invention.

In accordance with the present invention the upper portion of the shield 21, or at least the portion remote from the annular surfaces **34*a* and 34*b*, is rolled over as indicated at 38 to provide a more pleasing appearance and to eliminate an edge which might be sharp and engaged by personnel handling the shield 21. Moreover, to facilitate gripping of the shield 21, it preferably is provided with elongated protuberances 39** or other deformations which are formed during the manufacture of the shield, thus providing outwardly disposed ridges which can readily be gripped in removing the shield. These protuberances are preferably arranged in the area where contact between the shield and the tube is made in order to provide another feature of the present invention, as will become apparent from the following description.

Many electron discharge tubes require the dissipation of considerable heat therefrom due to filament current heat and the like, and the shielding device of the present invention is designed to provide improved cooling by providing a sort of chimney so that convection currents flowing upwardly past the tube envelope will cause substantial cooling thereof. To this end a series of openings such as 40 are provided adjacent the lower portion of the shield 21 which is spaced as indicated at Fig. 3 a substantial distance from the tube walls. The other function of the protuberances 39 now becomes apparent, since at least some are located along the annular line where contact between the tube 15 and the shield 21 occurs, and define, as indicated at 41, passageways for the convection currents to afford the desired cooling of the tube while still permitting the shield 21 to firmly engage the tube 15 and hold the same in position with respect to the tube socket not shown. Preferably and in accordance with the present invention the shield 21 touches the tube 15 near the top well above the hottest area of the tube. By employing such annular line contact, interrupted at spaced points by virtue of the protuberances 39, a very satisfactory holding operation of the tube 15 is provided without the possible damage occasioned by prior art devices where indentations were provided in the shield for engaging the tube and expansion of the glass tube envelope might well cause breakage. With the present invention expansion of the glass tube will merely cause a slight raising of the shield to permit relative sliding motion between the engaging surfaces **25*a* and 34*a*, respectively. Moreover, it will be understood that by using the tapered wall configuration of the shield 21**, inherent strength is produced so that deformations heretofore employed to increase the strength of the tube are not necessary with the present invention.

The manufacture of the shield device 21 of the present invention will readily be understood by those skilled in the art. As a first step in the process, a flat blank in the form of an isosceles trapezoid such as 30 shown in Fig. 6 of the drawings is stamped out from suitable sheet material. A second step in the process resides in simultaneously providing the protuberances 39, the openings 40, and the deformations to define the surfaces **34*a* and 34*b*, as shown in Fig. 7 of the drawings. Moreover, instead of being in a flat sheet following this operation, as shown in Fig. 6, the blank 30 is now somewhat S-shaped as shown in Fig. 8 of the drawings. As the next step in the manufacturing operation, the blank 30 shown in Figs. 7 and 8 of the drawings is rolled into the shape shown in Fig. 1 without the rolled upper edge 38, which may be accomplished by a subsequent manufacturing operation. In view of the detailed description included above, the construction and operation of the shielding device comprising the cooperating elements 21 and 22** will readily be understood and no further discussion thereof is included herewith.

Although in the preferred embodiment of the present invention the shield 21 is tapered from end to end, it need only be tapered for a part of its length if desired. In Figs. 9 to 13 of the drawings there is illustrated a modification of the present invention in which a shielding device generally designated at 50 in Fig. 9 of the drawings comprises a shield 51 and a clip or support 52 therefor. The support 52 is substantially identical with the support 22 described above, comprising the ears 53, having openings 54 defined therein and the upwardly extending portion 55. The portion 55, as viewed in Fig. 13 of the drawings, has a somewhat V-shaped cross section defined by the angularly disposed annular surfaces **56*a* and 56*b* arranged to cooperate with angularly disposed contiguous annular surfaces 57*a* and 58*a* of the shield 51 in the same manner already described in connection with the preceding embodiment of the drawings. A tube 15, comprising the prongs 16, illustrated in Fig. 9 of the drawings, may be shielded with the shield 50**. The essential difference between the modification shown in Fig. 9 of the drawings as compared to the modification shown in Fig. 3 of the drawings resides in the fact that in the previously described embodiment the walls of the shield 21 are essentially tapered from top to bottom, whereas in the embodiment of Fig. 9 only the upper portion of the shield 51 is tapered, as indicated at 51*a*, whereas the walls of the remaining portion of the shield are parallel. It will be understood that the tapered portion 51*a* will comprise the portion of the shield 51 where contact is made with the tube 15, and sufficient length of taper will be provided to take care of all the tolerances in diameter and length which manufacturers allow themselves in making such tubes. The shield 51 is, furthermore, indicated as comprising an overlap portion 60 to permit expansion for larger tube sizes, although it should be understood that it could be formed of a seamless piece with no overlap. Additionally, the shield 51 includes the openings 61 for air circulation, and the protuberances 62 serving the double function of affording a grip for the shield 51 as well as to provide an air passageway at the line of contact between the tapered portion 51*a* of the shield 51 and the tube 15.

In view of the detailed discussion included above, the operation of the tube shield of the present invention will be obvious. The base clips or support portions 22 or 52 will be fastened to the chassis or other grounded support where electron discharge valves are employed requiring shielding, preferably with the same fastening means that hold the tube sockets in position. The tubes to be inserted in the sockets are then properly positioned therein, whereupon the shield portions 21 and 51 may be slipped down over the tubes. The large diameter afforded by virtue of the angularly disposed annular surfaces 34*b* or 53*a* provides a sort of flared end to the lower portions of the shields, as viewed in the drawings, to permit ready slipping over the cooperating portions of the clip or base supports 22 or 52, respectively. Further downward movement of the shield will cause electrical engagement of the cooperating surfaces such as 25*a* and 34*a* of the shield 21 and clip 22, respectively. Since the inherent resilience of the shield will tend to cause it to assume a minimum diameter, the shield 21 will be pulled downwardly by the clip 22 by virtue of the cooperating surfaces 25*a* and 34*a*. Such downward pull will occur until the shield 21 makes annular line contact with the tube 15, whereupon the latter is firmly held in position in the socket 16, the holding force of the socket itself being supplemented by the force produced by the shielding device. Thus long tube life is provided by the convection cooling effect, an excellent grounding connection over a large area is provided, and the cost of manufacturing the shields of the present invention is low.

Figure 14:
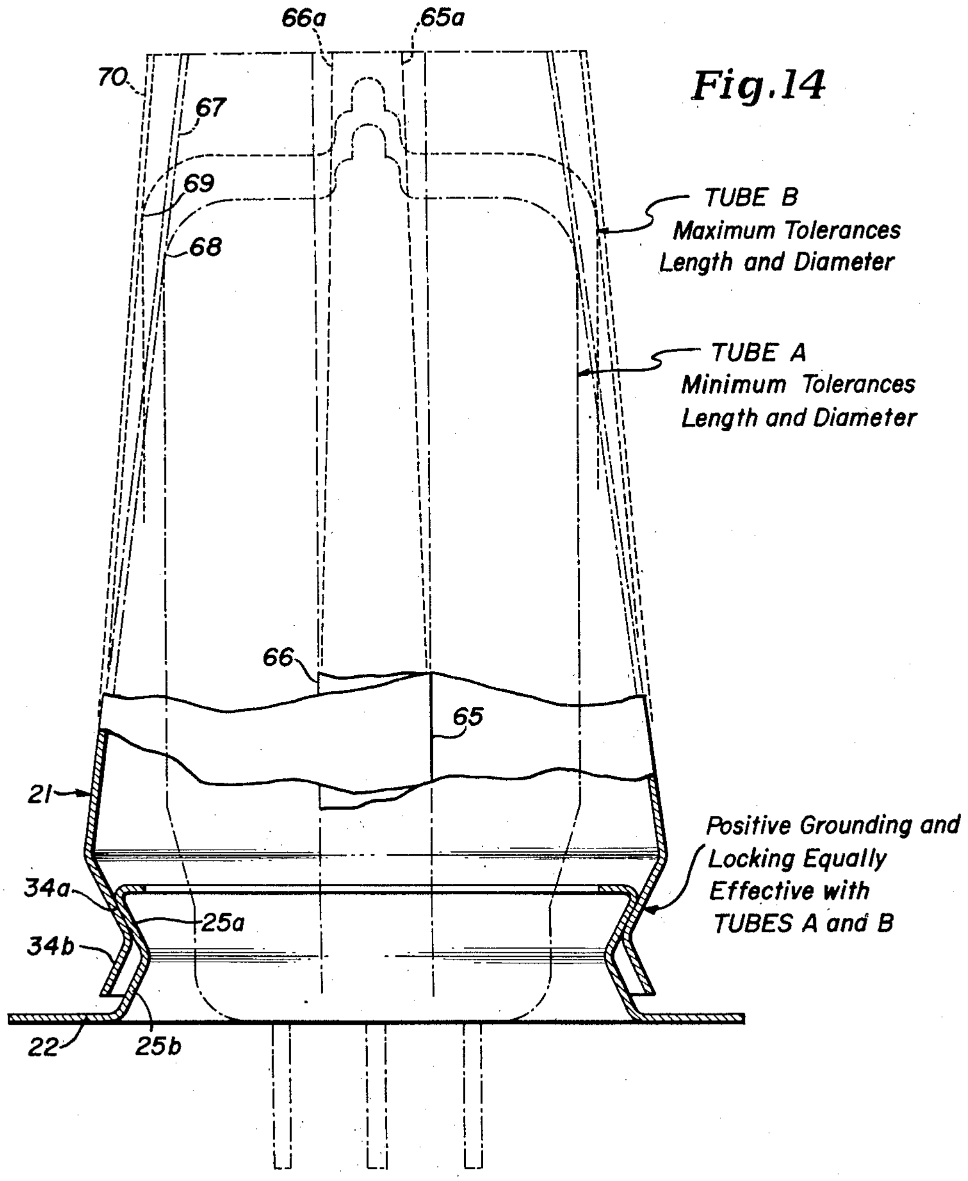
Fig. 14 is a diagrammatic drawing illustrating the principle of operation using electron tubes of maximum and minimum manufacturing tolerances for a tube of given size.

In Fig. 14 we have shown diagrammatically the novel functioning of our improved shielding device as applied to a tube designated A having minimum length and diameter tolerances specified by the tube manufacturer for a given tube, and a tube designated B having maximum length and diameter tolerances for the same tube. In this drawing the proportions are exaggerated solely for the purpose of illustrating the novel principle of operation. It will be observed that the lower end portion of the shield 21 and the base clip 22 are shown in full lines and in section to illustrate the coaction between these parts when the shield has been telescoped over the tube and moved to its final holding position with the tube firmly held in its mounting on the chassis. It will now be observed that this full line position of these parts is the same or substantially the same regardless of whether the shield is used with a small tube A or a large tube B. In either case the functioning of the shield is the same and the tube is held down against displacement from its mounting and against vibration or lateral displacement. It will be noted that regardless of the wide variances in length and diameter of tubes A and B the engagement between the interior angular surface 34*a* of the shield 21 and the exterior surface 25*a* of the base clip 22 is the same or substantially the same in that it provides a constant conducting contact between the shield and base clip at all times and in this engagement the contraction force of the shield combined with the action of the faces 25*a*—34*a* and the taper engagement of the shield and the tube serves to constantly exert a force in a direction tending to hold the shield down against the tube and the tube against outward displacement from its mounting. This full line drawing in Fig. 14 is substantially the same as Figs. 3 and 5 except that in Fig. 5 the shield 21 is in dotted lines. The showing of the tube 15 in Figs. 3 and 5 is the same as that of the smaller tube A in Fig. 14. To conform with Fig. 1 which shows the overlapping relation of the marginal edge portions of the longitudinally split shield, this same overlapping relation is shown in Fig. 14, the full line 65 indicating the outer longitudinal edge and the dotted lines 66 the inner longitudinal edge of the shield. The dotted lines 67 indicate the interior taper wall of the shield in engagement with the top crown portion 68 of the smaller tube A. When the shield is moved to the holding position over the larger tube B, the snap-over engagement of the lower end of the shield with the base clip is the same as with the smaller tube A, but in view of the larger diameter and greater length of the tube B the taper engagement of the interior wall 67 with the crown portion 69 causes expansion of the shield at its upper end to the line indicated by 70. In this action the overlap of the shield is reduced at its upper end, the edge 65 moving to 65*a* and the edge 66 moving to 66*a*, and the overlap at the bottom is the same as with the smallest tube because the engagement between the surfaces 25*a* and 34*a* is the same or substantially the same regardless of the variations in the tube dimensions. Thus, under all circumstances of tube variances for a given tube there is constant contact and pressure exerted between the shield and the chassis and between the shield and the tube in a manner to insure good grounding contact and to hold the tube in its mounting notwithstanding vibration and shock.

It will also be manifest that in the application of our invention to the wide range of tube mountings and chassis constructions the shield and its mounting may be adapted to such varying requirements. For example, the base clip or the structure corresponding to what we term the base clip, may be formed to provide the functions herein described and claimed. In this connection, we have used in some of the claims the term "under-reaching surface" in referring to what is shown in the present illustration as the surface 25*a*.

While several embodiments of the present invention have been described, it will be obvious to those skilled in the art that various changes and modifications may be made without departing from the present invention in its broader aspects. It is aimed in the appended claims to cover all such changes and modifications as fall within the true spirit and scope of the present invention.

What is claimed as new and desired to be secured by Letters Patent of the United States is:

1. A shielding device for an electron tube which has a plug mounting on a chassis, comprising a base clip fixed on the chassis having an exterior V-shaped groove, a tubular shield body split longitudinally with its longitudinal edge portions in overlapping relation providing a resilient contraction force in resistance to expansion of the tube, the lower end portion of the shield body having an interior V-shaped surface arranged to snap over the upper edge of said V-shaped groove and position its upper angular interior surface in sliding engagement with the upper angular exterior surface of said V-shaped groove on the base clip and to be constantly urged into said engagement by said contraction force of the split shield to effect a downward force tending to hold the shield body in said engagement, the sleeve body having a longitudinal taper to engage the crown portion of a tube when the shield body is telescoped over the tube into said engagement when the tube is in its mounted position, said taper having constant engagement with said crown portion by said contraction force of the split shield, the combined function of said taper engagement and said engagement between the angular interior surface of the shield and said exterior surface of the base clip serving to constantly maintain the shield body in its taper engagement with the crown portion of the tube and also serving to maintain the tube against outward displacement from its mounting on the chassis regardless of variations in length and diameter of the tube within specified manufacturing tolerances for a given tube.

2. A shielding device as set forth in claim 1, in which the split shield will be expanded at its upper end when telescoped over a tube of larger dimension tolerances than a tube of smaller dimension tolerances, the taper of the shield engaging the crown portion of said larger tube and causing said expansion of said upper end of the shield while the lower end of the shield is maintained in said engagement with the V-shaped groove.

References Cited in the file of this patent

UNITED STATES PATENTS

| | | |
|---|---|---|
| 1,748,772 | Hunker | Feb. 25, 1930 |
| 2,080,913 | Hafecost et al. | May 18, 1937 |
| 2,120,024 | Fausset | June 7, 1938 |
| 2,379,898 | Geertsen | July 10, 1945 |
| 2,499,612 | Staver | Mar. 7, 1950 |

FOREIGN PATENTS

| | | |
|---|---|---|
| 754,773 | France | Aug. 28, 1933 |